Feb. 25, 1930.  O. GATZSCH  1,748,446

ELECTRICALLY DRIVEN WOOD WORKING MACHINE

Filed Jan. 28, 1928

Inventor:
Oskar Gatzsch,
atty.

Patented Feb. 25, 1930

1,748,446

UNITED STATES PATENT OFFICE

OSKAR GATZSCH, OF RUTI, SWITZERLAND

ELECTRICALLY-DRIVEN WOODWORKING MACHINE

Application filed January 28, 1928, Serial No. 250,269, and in Switzerland February 2, 1927.

Heretofore electrically driven wood working machines have already been proposed, having arranged at the side of the working table of the machine a stationary standard with a swivelling telescoping shaft and an arm mounted thereon on which the driving motor to hold the tool has been fastened adjustably. The proposed arrangements however had several disadvantages. In the first place the connection between the motor and the arm was such, that the latter could only swivel either in one plane, or if in two planes, then only over a range insufficiently small, whereby the arrangement allowed an adjustment only in a few entirely determined positions. Also, even if a wider swivelling range was possible, the chosen connecting members were such that the motor could not work without vibrating, so that the respective machines could only be used for lighter work but not for machining large timbers. In cases where the motor was displaceable along the arm the latter impeded the swivelling range of the motor very much. Though the arm itself has already been constructed displaceable, this was effected on one part in machines of an entirely different type with an old fashioned belt-drive, on the other the possibilities of adjusting the motor as well as the tool were also in this case very small, in many cases there was no displacement of the arm possible during the working, that is to say no feed motion could be made in the direction of the arm.

These inconveniences are overcome by the arrangement of the present invention.

This is effected with the wood working machine according to the present invention, in mounting the driving motor so as to be universally adjustable and turnable in two planes of adjustment through an angle of 360° by means of a universal joint provided in one or both ends of the arm which is horizontally displaceable in a manner known per se.

Owing to this arrangement the tool can be adjusted into all desired working positions so that any chucking of the work to be machined on its sides is avoided, which is especially of great advantage for the machining of heavy timbers, stair stringers etc. The tool is held fast and free from vibrations in every working position.

Figure 1:
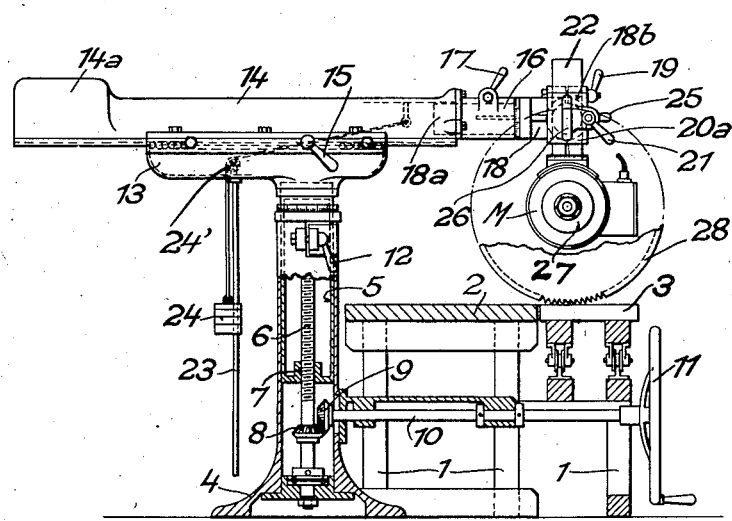
Figure 2:
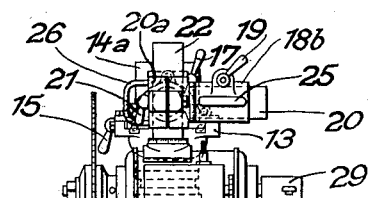
Figure 3:
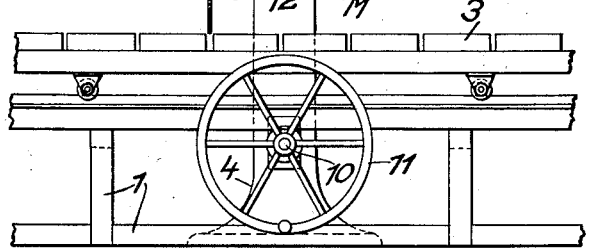

A constructional example of the subject matter of the invention is shown on the accompanying drawing; it represents:

Fig. 1, the machine partly in side elevation, partly in section,

Fig. 2 a front elevation of the same,

Fig. 3 a plan view of the middle part of the machine.

1 is the machine frame with the stationary working table 2 and the carriage 3 for fixing work, moving by means of rollers on a parallel track in front of the former. At the side of the working table a stationary hollow standard 4 is provided in which a shaft 5 is turnably and telescopically mounted. For the adjustment in height there is provided a screw threaded spindle 6 which cooperates with a nut 7 of the shaft and carries a bevel gear wheel 8 to cooperate with a bevel gear wheel 9 which is connected to a shaft 10 mounted horizontally in bearings on the machine frame. The shaft 10, secured against longitudinal displacement, carries a hand wheel 11 which permits a vertical adjustment of the shaft 5 from the front of the machine. For the fixation of the shaft 5 in a chosen angular position there is provided a lateral clamping screw 12 cooperating with the slotted head of the standard. The shaft 5 is provided on its upper end with a horizontal extension 13 in which an arm 14 is mounted, to be endwise movable therein between parallel guides. This arm 14 runs on balls and can be fixed in a chosen position by means of a lateral clamping screw 15 on the extension 13. At the front end of the arm 14 a clamping sleeve 16 is provided, in which a bearing support for crossed axle or universal joint to carry the motor M, which can be fixed in any angular position by means of a clamping screw 17, is turnably mounted. The support for crossed axles shows primarily an offset lateral arm 18, one end of which terminates in a fulcrum pin 18$^a$ mounted in the clamping sleeve 16, while the other end is shaped to form a clamping sleeve 18$^b$ with clamping screw 19. The clamping sleeve 18$^b$ holds a fulcrum pin 20, carrying on the one end a clamping sleeve 20ª arranged at right angles to the former and provided with a clamping screw 21 and in this clamping sleeve 20ª a further fulcrum pin 22 is mounted to the one end of which the driving motor M is connected. In this manner the driving motor together with the tool can be adjusted in any position within its working range and be fixed therein by means of the provided clamping screws. To counterbalance the weight of the support for crossed axles as well as of the driving motor a counterweight 14ª is fastened to the other end of the arm 14 and in order to facilitate the displacement of the arm 14 a counterweight 24, which is attached to the arm by means of a steel cable which is guided over a roll 24', is slidable up and down a rod 23. To facilitate the adjustment of the support for crossed axles handles 25 and 26 are provided on its individual parts.

The shaft of the motor shows on its one end a clamping washer 27 for the connection with a circular saw 28 and on the other a chuck 29 for milling cutters, drills and other tools to be clamped therein.

For the determination of the angle of adjustment graduating scales are provided on the standard as well as on all the individual parts swivelling relatively to each other.

With this machine all work applying to wood connections and intersecting joints can be executed in any position of adjustment, and the adjustment can be effected in a quick and easy manner from the front side of the machine without the aid of a spanner.

By raising the hollow shaft 5 and lowering the fulcrum pin 22 a large sized saw 28, as shown, can be revolved on this pin in a full circle. The plane of the saw can be set at any angle by rotating the off-set lateral arm 18 and fulcrum pin 18ª.

I claim:

1. In an electrically driven wood working machine, in combination, a standard, a shaft turnably and telescopically mounted in said standard, a support provided on the upper end of said shaft and shaped to form a horizontal guide, an arm mounted in said guide and endwise displaceable therein, a universal joint comprising a bracket one end of which forms a pivot pin mounted in said displaceable arm and the other end forming a clamping sleeve, a pivot pin mounted in said clamping sleeve and having one end shaped to form a clamping sleeve, and an electric motor for driving a tool mounted in said last mentioned clamping sleeve by means of a pivot pin and adapted to be universally adjustable and turnable through an angle of 360° in two planes of adjustment.

2. In an electrically driven wood working machine, in combination, a standard, a shaft turnably and telescopically mounted in said standard, a support provided on the upper end of said shaft and shaped to form a horizontal guide, an arm mounted in said guide and endwise displaceable therein, a universal joint, comprising a bracket one end of which forms a pivot pin mounted in said displaceable arm and the other end forming a clamping sleeve the axis of which is at right angles to the axis of the pin, a member having a pivot pin mounted in said clamping sleeve and a clamping sleeve the axis of which is at right angles to the axis of said pin, and an electric motor for driving a tool mounted in said last mentioned clamping sleeve by means of a pivot pin and adapted to be universally adjustable and turnable through an angle of 360° in two planes of adjustment.

In testimony whereof, I have signed my name to this specification.

OSKAR GATZSCH.